US012668859B2

(12) United States Patent
Behr et al.

(10) Patent No.: US 12,668,859 B2
(45) Date of Patent: Jun. 30, 2026

(54) COMPONENT, IN PARTICULAR FOR A VEHICLE, AND METHOD FOR PRODUCING SUCH A COMPONENT

(71) Applicant: Daimler AG, Stuttgart (DE)

(72) Inventors: Robert Behr, Wernau (DE); Bernd Schietinger, Esslingen (DE); Juergen Weber, Besigheim (DE)

(73) Assignee: Mercedes-Benz Group AG, Stuttgart (DE)

( * ) Notice: Subject to any disclaimer, the term of this patent is extended or adjusted under 35 U.S.C. 154(b) by 469 days.

(21) Appl. No.: 17/609,193

(22) PCT Filed: Apr. 6, 2020

(86) PCT No.: PCT/EP2020/059734
§ 371 (c)(1),
(2) Date: Nov. 5, 2021

(87) PCT Pub. No.: WO2020/224894
PCT Pub. Date: Nov. 12, 2020

(65) Prior Publication Data
US 2022/0228241 A1     Jul. 21, 2022

(30) Foreign Application Priority Data

May 6, 2019     (DE) ..................... 10 2019 003 187.3

(51) Int. Cl.
*C22C 21/02*          (2006.01)
*B22F 10/28*          (2021.01)
(Continued)

(52) U.S. Cl.
CPC .............. *C22C 21/02* (2013.01); *B22F 10/28* (2021.01); *B33Y 80/00* (2014.12); *C22F 1/043* (2013.01); *B22F 2301/052* (2013.01)

(58) Field of Classification Search
CPC .......... C22C 21/02; C22C 21/04; C22F 1/043
See application file for complete search history.

(56) References Cited

U.S. PATENT DOCUMENTS 2,075,090 A  *  3/1937  Bonsack ................. C22C 21/02
                                                            420/541
2019/0291182 A1      9/2019  Bobel et al.

FOREIGN PATENT DOCUMENTS

CN          107058816 A      8/2017
CN          108103366 A      6/2018
(Continued)

OTHER PUBLICATIONS

English Abstract and English Machine Translation of Masse et al.. (WO 2018/115638) (Jun. 28, 2018).*
Elhadari, H. A., et al. "Tensile and fatigue properties of a cast aluminum alloy with Ti, Zr and V additions." Materials Science and Engineering: A 528.28 (2011): 8128-8138.*
(Continued)

*Primary Examiner* — Jessee R Roe
(74) *Attorney, Agent, or Firm* — Crowell & Moring LLP

(57)          ABSTRACT

A component includes a sub-region, where the component is produced at least in the sub-region by an additive manufacturing process. The sub-region is produced from an aluminum alloy which has 12% by weight to 40% by weight silicon, 0.3% by weight to 4% by weight copper, 0.2% by weight to 0.7% by weight magnesium, at most 1% by weight iron, at most 0.5% by weight zirconium, and a remainder which includes aluminum and further accompanying elements and/or production-related impurities that each have a mass fraction of at most 0.3 percent individually and that in total have a mass fraction of at most 1.5 percent.

10 Claims, 1 Drawing Sheet

(51) Int. Cl.
B33Y 80/00 (2015.01)
C22F 1/043 (2006.01)

(56) References Cited

FOREIGN PATENT DOCUMENTS

| | | | |
|---|---|---|---|
| CN | 109482893 | A | 3/2019 |
| CN | 109706353 | A | 5/2019 |
| DE | 10 2015 221 643 | A1 | 5/2017 |
| DE | 10 2019 106 979 | A1 | 9/2019 |
| EP | 3 165 620 | A1 | 5/2017 |
| JP | 5-335612 | A | 4/1978 |
| JP | 4-325648 | A | 11/1992 |
| JP | 5-179383 | A | 7/1993 |
| JP | 6-330263 | A | 11/1994 |
| RU | 2 688 039 | C1 | 5/2019 |
| WO | WO 2018/115638 | A1 | 6/2018 |
| WO | WO 2018/206876 | A1 | 11/2018 |

OTHER PUBLICATIONS

Shi, Cangji, and X-Grant Chen. "Effect of Zr addition on hot deformation behavior and microstructural evolution of AA7150 aluminum alloy." Materials Science and Engineering: A 596 (2014): 183-193.*

Chinese Office Action issued in Chinese application No. 202080032771.2 dated Mar. 17, 2022, with partial English translation (Eleven (11) pages).

German-language European Office Action issued in European application No. 20 717 630.6-1108 dated Dec. 9, 2022 (Five (5) pages).

PCT/EP2020/059734, International Search Report dated Jun. 19, 2020 (Two (2) pages).

German-language German Office action issued in German application No. 10 2019 003 187.3 dated Nov. 19, 2019 (Six (6) pages).

Chinese Office Action issued in Chinese application No. 202080032771.2 dated Aug. 16, 2022, with partial English translation (Ten (10) pages).

U.S. Notice of Allowance issued in U.S. Appl. No. 18/793,195 dated Aug. 26, 2025 (12 pages).

* cited by examiner

COMPONENT, IN PARTICULAR FOR A VEHICLE, AND METHOD FOR PRODUCING SUCH A COMPONENT

BACKGROUND AND SUMMARY OF THE INVENTION

The invention relates to a component, in particular for a vehicle. Furthermore, the invention relates to a method for producing such a component.

An aluminum alloy is known from DE 10 2015 221 643 A1. The aluminum alloy has 3.5 to 6.0 percent by weight (wt. %) magnesium. Furthermore, DE 10 2019 106 979 A1 discloses a method for producing a three-dimensional aluminum alloy part, wherein an aluminum alloy powder feed material is provided. In addition, a method for producing a sintered aluminum alloy is known from JP-H04-325648 A.

The object of the present invention is to provide a component and a method, such that the component can be produced in a particularly advantageous manner.

A first aspect of the invention relates to a component, preferably for a vehicle. Thus, the invention preferably also includes a use of the component, wherein the component is used for or in a vehicle, in particular for or in a motor vehicle. The component is produced, at least in a sub-region, by means of an additive manufacturing process. Here, at least the sub-region is produced from an aluminum alloy. In other words, the component is produced at least in a sub-region from an aluminum alloy by means of an additive manufacturing process, wherein the additive manufacturing process is also referred to as a generative manufacturing process. The feature that the component is produced at least in the sub-region by means of an additive manufacturing process is to be understood in particular to mean that the component is produced completely or at least partially by means of an additive manufacturing process. At least the sub-region is thus an additively produced component volume which is produced from the aluminum alloy, which is also referred to as an aluminum-based alloy.

The aluminum alloy and thus the partial volume have from 12% by weight to 40% by weight silicon. In other words, the aluminum alloy and thus at least the component volume have a silicon content of from 12% by weight to 40% by weight. Again in other words, silicon is a first component of the aluminum alloy, wherein the first component has a mass fraction of from 12 percent (%) to 40 percent (%). Furthermore, the aluminum alloy or the component volume has from 0.3% by weight to 4% by weight copper (Cu), 0.2% by weight to 0.7% by weight magnesium (Mg), a maximum of 1% by weight iron (Fe) and a maximum of 0.5% by weight zirconium (Zr). This means that copper is a second component, magnesium is a third component, iron is a fourth component, and zirconium is a fifth component of the aluminum alloy also simply referred to as an alloy, wherein the second component has a mass fraction of from 0.3% to 4%, the third component has a mass fraction of from 0.2% to 0.7%, the fourth component has a mass fraction of at most 1%, and the fifth component has a mass fraction of at most 0.5%.

Again in other words, the mass fraction of the first component is in a range of from 12 percent to 40 percent, inclusive. The mass fraction of the second component is in a range of from 0.3 percent to 4 percent, inclusive, the mass fraction of the third component is in a range of from 0.2 percent to 0.7 percent, inclusive, the mass fraction of the fourth component is not more than 1 percent, and the mass fraction of the fifth component is not more than 0.5 percent.

As the remainder, the aluminum alloy has aluminum with individually at most 0.3% by weight in each case and in total at most 1.5% by weight of further accompanying elements and/or production-related impurities. In other words, the further accompanying elements and/or the impurities each have individually a mass fraction of at most 0.3 percent and in total, i.e., in sum, a mass fraction of at most 1.5 percent.

Preferably, the additive manufacturing process, by means of which the component is produced, at least in the sub-region, is or comes from the group consisting of selective laser melting, selective electron beam melting, selective laser sintering, selective electron beam sintering, wire build-up welding and powder build-up welding. The component according to the invention is an aluminum component, wherein, due to at least the sub-region being formed by means of an additive manufacturing process and from the aluminum alloy described, it can have the following advantageous properties:

high static and/or dynamic strength with low weight, such that the component can be manufactured in lightweight construction; and/or high tribological resistance; and/or low coefficient of thermal expansion.

The invention is based in particular on the following findings: conventional, generally known silicon-containing casting alloys can have good strength values with good to very good component yield by appropriate alloying and heat treatment concepts. However, the design freedom is limited by the boundary conditions of the casting process. By way of example, bionic designs cannot generally be implemented by casting. Even in die casting, cooling rates of only about 40 Kelvin per second are possible. This means that a relatively large material structure can be created. In the case of hypoeutectic aluminum casting alloys (eutectic casting alloys have about 12% by weight silicon), this means that the primarily precipitated aluminum phase has a dendrite arm spacing of about 20 micrometres. Hypereutectic aluminum casting alloys, which tend to be produced by gravity die casting or sand casting, generally have relatively large silicon particles (>10 micrometres, preferably coarser). These large phases in the casting alloys mentioned have an overall negative effect on the mechanical properties, in particular on the dynamic strength parameters. The use of higher silicon contents in cast alloys is therefore only possible to a limited extent. However, it is known to use the alloying elements copper, magnesium and zirconium to increase strength.

Spray-compacted products are also known. Comparatively higher silicon contents are easier to implement with such spray-compacted products. Aluminum-based alloys with significantly higher silicon contents are available. Such alloys are used, for example, to produce cylinder liners. The manufacturing process involves spray compacting diluted powders with post-treatment, for example extrusion. At $10^3$ to $10^4$ Kelvin per second, the cooling rate in spray compacting is significantly higher than in casting. This results in a significantly finer microstructure than with conventional casting alloys. Consequently, higher proportions of then finer silicon are also positive in terms of component strength.

The invention now uses additive manufacturing with an aluminum-based alloy. In additive manufacturing, for example in selective laser melting, significantly higher again cooling rates of $10^5$ to $10^6$ Kelvin per second can be achieved. This can result in an even finer structure than with spray-compacted components or even cast components. Aluminum-based alloys with silicon contents of up to around 12% by weight are processed using additive manufacturing technologies. The chemical composition of these alloys is generally based on conventional casting alloys such as AlSi9Cu3, AlSi7Mg, AlSi10Mg. The achieved material properties are generally rather unsatisfactory in view of the cost-intensive manufacturing process involved in additive manufacturing. High-strength values for additively manufactured aluminum components are achieved by using an alloying element, in particular in the form of scandium. However, this is very cost-intensive. Therefore, the use of scandium greatly increases the manufacturing costs.

These aforementioned problems and disadvantages can be avoided by means of the invention. In the case of the aluminum alloy, silicon is the main alloying element. Through a very fast cooling process, which can be implemented in the additive manufacturing process, a very fine basic structure can be implemented at least of the sub-region or component volume. The high silicon content has a strength-increasing effect rather than a service life-minimizing effect. Due to the very high cooling rates in additive manufacturing, especially compared to spray compacting, an even finer microstructure with better strength and/or elongation properties can be implemented with the same chemical composition. Common alloying concepts, as known from the classical casting technology of aluminum, can be adopted. By way of example, the strength-increasing effect of precipitation hardening elements such as copper, magnesium and zirconium can be utilized. However, the use of nickel as an alloying element is dispensed with, such that the aluminum alloy according to the invention is free of nickel or such that nickel is at most one of the production-related impurities.

The remainder is also referred to as the residual amount and comprises aluminum with production-related accompanying elements such as nickel, manganese, titanium, zinc, vanadium, chromium, molybdenum, strontium, each with a maximum of 0.3% by weight individually and a maximum of 1.5% by weight in total. In other words, the production-related accompanying elements can be the production-related impurities. Overall, it can be seen that the aluminum alloy in the additively produced component volume has a silicon content of from 12% by weight to 40% by weight, a copper content of from 0.3% by weight to 4% by weight, a magnesium content of from 0.2% by weight to 0.7% by weight, an iron content of at most 1% by weight and a zirconium content of at most 0.5% by weight.

It has been shown to be particularly advantageous if the copper content of the aluminum alloy and thus in the additively produced component volume is in a range of from 0.3% by weight to 2.1% by weight inclusive, in particular in a range of from 0.5% by weight to 0.8% by weight inclusive. In other words, it has been shown to be particularly advantageous if the aluminum alloy comprises 0.3% by weight to 2.1% by weight, in particular 0.5% by weight to 0.8% by weight, copper. Again expressed in other words, the mass fraction of the second component is in a range of from 0.3 percent to 2.1 percent inclusive, preferably in a range of from 0.5 percent to 0.8 percent inclusive.

It has further been shown to be particularly advantageous if the aluminum alloy comprises 0.2% to 0.6% by weight, in particular 0.2% to 0.5% by weight, of magnesium. In other words, preferably the mass fraction of the third component is in a range of from 0.2 percent to 0.6 percent inclusive, in particular in a range of from 0.2 percent to 0.5 percent inclusive. Again expressed in other words, it is preferably provided that the magnesium content of the aluminum alloy and thus in the additively produced component volume is in a range of from 0.2% by weight to 0.6% by weight inclusive, in particular in a range of from 0.2% by weight to 0.5% by weight inclusive.

A further embodiment is characterized in that the aluminum alloy comprises at least 0.05% by weight and at most 0.35% by weight zirconium. In other words, it is preferably provided that the mass fraction of the fifth component (zirconium) is at least 0.05 percent and at most 0.35 percent. Again expressed in other words, it is preferably provided that the zirconium content in the aluminum alloy and thus in the additively produced component volume is at least 0.05% by weight and at most 0.35% by weight.

In a particularly advantageous embodiment of the invention, the iron content in the aluminum alloy and thus in the additively produced component volume is at most 0.5% by weight and in particular at most 0.35% by weight. In other words, it is preferably provided that the aluminum alloy comprises a maximum of 0.5% by weight, in particular a maximum of 0.35% by weight of iron. Again expressed in other words, it is preferably provided that the mass fraction of the fourth component (iron) is at most 0.5 percent, in particular at most 0.35 percent.

In a particularly advantageous embodiment of the invention, the component is present entirely or at least in sections in a heat-treated state. In other words, it is preferably provided that the component is at least partially heat-treated. This is to be understood to mean that the component is at least partially subjected to heat treatment. In this context, it has been shown to be particularly advantageous if the component is subjected to heat treatment at least in the partial region, such that at least the partial region of the component is heat-treated.

Here, it is preferably provided that the component is at least partially and thus, for example, at least in the partial region, annealed in a stress-relief manner and/or solution-annealed and/or artificially aged. In other words, it is preferably provided that the heat treatment process, simply also referred to as heat treatment, comprises stress-relief annealing and/or solution-annealing and/or artificial ageing.

In order to implement particularly advantageous, in particular mechanical, properties of the component, it is provided in a further embodiment of the invention that the aluminum alloy comprises 12% by weight to 18% by weight, in particular 13.5% by weight to 15.5% by weight, silicon. In other words, it is preferably provided that the mass fraction of the first component (silicon) is preferably in a range of from 12 percent to 18 percent inclusive, in particular in a range of from 13.5 percent to 15.5 percent inclusive.

A second aspect of the invention relates to a method for producing a component. In a first step of the method, a powder or a wire is provided, wherein the powder or the wire is formed from an aluminum alloy, in particular according to the first aspect of the invention. The aluminum alloy has from 12% by weight to 40% per weight silicon as the first component, 0.3% by weight to 4% by weight copper as the second component, 0.2% by weight to 0.7% by weight magnesium as the third component, a maximum of 1% by weight iron as the fourth component, a maximum of 0.5% by weight zirconium as the fifth component, and the residual aluminum having individually a maximum of 0.3% by weight in each case and in total a maximum of 1.5% in total of production-related impurities. The above-mentioned components are alloying elements by means of which, or by means of their mass fractions, particularly advantageous properties of the aluminum alloy and thus of the component can be implemented.

In a second step of the method, preferably following the first step, at least a partial region of the component is produced from the powder or from the wire by means of an additive manufacturing process, such that the component is produced at least partially or completely from the aluminum alloy by means of an additive manufacturing process Here, it has been shown to be particularly advantageous if the component, in particular after the second step, is subjected at least partially, in particular in the partial region, to an optionally provided heat treatment process. In particular, it is conceivable that the component is subjected at least partially, in particular at least in a partial region, or completely to exactly one heat treatment process or several heat treatment processes. Optionally, a post-compression of the component can take place before and/or during and/or after the at least one heat treatment process. In particular, the following advantages can be implemented by the invention:

high specific strength, high tribological resistance and low coefficient of thermal expansion of the component;

degrees of freedom in the design of the component through additive manufacturing, such that, for example, at least one or more bionic structures can be produced by the additive manufacturing process;

possibility of functional integration.

The invention uses the knowledge that silicon has a relatively low coefficient of thermal expansion. The use of a high silicon content therefore suggests a very low coefficient of thermal expansion on the overall alloy, which may be advantageous, in particular when used to produce a crankcase. Thus the component can preferably be a component of an internal combustion engine, in particular a reciprocating internal combustion engine. Preferably, the component is a crankcase of an internal combustion engine. The silicon-containing aluminum alloy can be used, for example, for components subjected to tribological stress. In particular, the aluminum alloy can be used to make, for example, a path for a piston of a reciprocating engine, such that the component can be a path for a piston of a reciprocating engine. Furthermore, in the invention, cost-intensive alloying elements can be avoided or the number of such cost-intensive alloying elements can be kept particularly low, such that the component can be produced particularly inexpensively.

The aforementioned solution annealing is carried out, for example, in a temperature range of from 480 degrees Celsius to 530 degrees Celsius inclusive, in particular followed by rapid quenching and subsequent artificial ageing.

Further advantages, features and details of the invention emerge from the following description of a preferred exemplary embodiment and from the drawings. The features and combinations of features mentioned above in the description, as well as the features and combinations of features mentioned below in the description of figures and/or shown alone in the figures, can be used not only in the combination specified in each case, but also in other combinations or on their own, without departing from the scope of the invention.

DETAILED DESCRIPTION OF THE DRAWINGS

Figure 1:
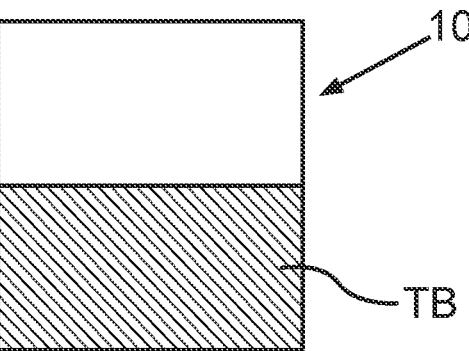
FIG. 1 is a schematic side view of a component according to the invention.
Figure 2:
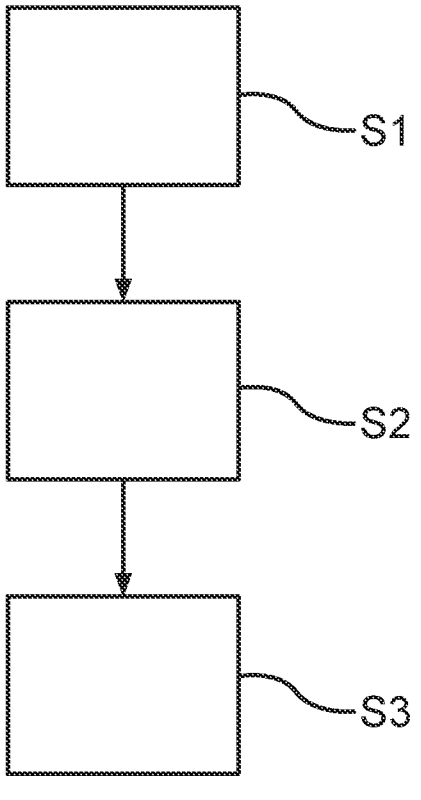
FIG. 2 is a flow diagram illustrating a method of manufacturing the component according to the invention.

FIG. 1 shows, in a schematic side view, a component 10, in particular for a vehicle such as a motor vehicle, for example. The component 10 is, for example, a component of an internal combustion engine, by means of which the motor vehicle can be driven. The internal combustion engine is preferably a reciprocating engine. The component 10 can be a crankcase of the internal combustion engine, for example. In order to implement particularly advantageous properties of the component 10 and to manufacture the component 10 particularly advantageously, at least one sub-region TB of the component 10 is manufactured from an aluminum alloy by means of an additive manufacturing process and thus in an additive manner. In particular, it is conceivable that the component 10 is completely manufactured by means of a or by means of the additive manufacturing process. Alternatively or additionally, it is conceivable that the component 10 is completely manufactured from the aforementioned aluminum alloy. Alternatively, it is also imaginable that the component 10 is manufactured in sections or completely by using multiple additive manufacturing processes. The aluminum alloy is also referred to as an aluminum-based alloy and has 12% by weight to 40% per weight silicon as the first component, 0.3% by weight to 4% by weight copper as the second component, 0.2% by weight to 0.7% by weight magnesium as the third component, a maximum of 1% by weight iron as the fourth component and a maximum of 0.5% by weight zirconium as the fifth component. The components are alloying elements in each case, wherein the first component has a mass fraction which is in a range of from 12 percent to 40 percent inclusive. The second component has a mass fraction which is in a range of from 0.3 percent to 4 percent inclusive. The third component has a mass fraction which is in a range of from 0.2 percent to 0.7 percent inclusive. The fourth component has a mass fraction which is at most or maximally 1 percent. The fifth component has a mass fraction which is at most or maximally 0.5 percent. As the remainder, the aluminum alloy has aluminum with a maximum of 0.3% by weight individually in each case and a maximum of 1.5% by weight in total of production-related impurities. In other words, the production-related impurities each have a mass fraction of at most 0.3 percent individually and overall, i.e., in total, a mass fraction of at most 1.5 percent.

FIG. 1 shows a flow diagram, on the basis of which a method for producing the component 10 is illustrated below. In a first step S1 of the method, a starting material is provided. This starting material is referred to simply as material, substance or starting substance. The starting material is a wire or a powder, such that in the first step S1 of the method, the wire or the powder is provided. The starting material is formed from the aforementioned aluminum alloy, such that in the first step S1 of the method, the aforementioned aluminum alloy is provided in wire or powder form.

In a second step S2 of the method, at least the sub-region TB of the component 10 is produced from the starting material, i.e., from the powder or from the wire by means of the aforementioned additive manufacturing process. This means that, in the second step S2 of the method, the additive manufacturing process is carried out. By means of the additive manufacturing process, the component 10 is additively manufactured, i.e., additively produced, from the aluminum alloy at least in the sub-region TB.

During or after the second step S2, the component 10 is provided, which is or was manufactured completely or at least partially by means of the additive manufacturing process. The additive manufacturing process is, for example, a process selected from the following group: selective laser melting, selective electron beam melting, selective laser sintering, selective electron beam sintering, wire build-up welding and power build-up welding. It is also conceivable to combine several additive manufacturing processes from the aforementioned group.

After the second step S2 of the method, in particular after providing the component 10, a third step S3 of the method is preferably and thus optionally carried out. In the third step S3 of the method, the component 10 is subjected at least partially, in particular at least in the sub-region TB, at least or exactly to a heat treatment process. A heat treatment process may be stress relief annealing, or the heat treatment process can be stress relief annealing. In the stress relief annealing, the component 10 is at least partially annealed at a temperature of 200 degrees Celsius to 350 degrees Celsius for a period of time of 30 minutes to 5 hours, particularly preferably with optional subsequent slow cooling, to achieve a stress-relief annealed state of the component 10. Through this, the component 10 can be implemented as a soft component with high elongation at break, i.e., with high deformability and/or low irreversible thermal expansion.

By way of example, as an alternative to stress relief annealing, solution annealing can be carried out with subsequent artificial ageing. The artificial ageing is also referred to as artificial ageing treatment. In other words, it is preferably provided that the heat treatment process alternatively comprises solution annealing and subsequent artificial ageing. In the solution annealing, the component 10 is at least partially annealed at a temperature of from 450 degrees Celsius to 545 degrees Celsius for a period of up to 12 hours, particularly preferably followed by rapid cooling or quenching of the component 10 to produce a supersaturated solid solution as a prerequisite for effective artificial ageing thereafter. After solution annealing, the aforementioned artificial ageing of the component 10 for precipitation hardening takes place. By way of example, the component 10 is artificially aged at a temperature of from 150 degrees Celsius to 240 degrees Celsius for a period of 30 minutes to 12 hours. One objective may be to implement a high static strength and/or a high dynamic strength of the component 10, for example in the maximum hardened state T6. Another objective may be to implement a reduced strength of the component 10 compared to the one objective, but with lower irreversible thermal expansion, in particular in the overaged state T7.

LIST OF REFERENCE CHARACTERS 10 component
S1 first step

8

S2 second step
S3 third step
TB sub-region
The invention claimed is:

1. A component, comprising:
a sub-region, wherein the component is produced at least in the sub-region by an additive manufacturing process;
wherein the sub-region is produced from an aluminum alloy which comprises:
12% by weight to 40% by weight silicon;
0.3% by weight to 4% by weight copper;
0.2% by weight to 0.7% by weight magnesium;
at most 1% by weight iron;
at most 0.5% by weight zirconium; and
a remainder which comprises aluminum and further accompanying elements and/or production-related impurities that each have a mass fraction of at most 0.3 percent individually and that in total have a mass fraction of at most 1.5 percent,
wherein the component is part of an internal combustion engine, and
wherein at least the subregion of the component comprises a finer microstructure than cast alloys of the same chemical composition.

2. The component according to claim 1, wherein the aluminum alloy has from 0.5% by weight to 0.8% by weight copper.

3. The component according to claim 1, wherein the aluminum alloy has 0.2% by weight to 0.5% by weight magnesium.

4. The component according to claim 1, wherein the aluminum alloy has at least 0.05% by weight and a maximum of 0.35% by weight of zirconium.

5. The component according to claim 1, wherein the aluminum alloy has a maximum of 0.35% by weight iron.

6. The component according to claim 1, wherein the component is at least partially heat-treated.

7. The component according to claim 6, wherein the component is at least partially stress-relief annealed and/or solution-annealed and/or artificially aged.

8. The component according to claim 1, wherein the aluminum alloy has 13.5% by weight to 15.5% by weight of silicon.

9. The component according to claim 1 being in a maximum hardened state T6.

10. The component according to claim 1 being in an overaged state T7.

* * * * *